B. McCollum.
Window Shutter.

N° 59,430. Patented Nov. 6, 1866.

Witnesses:
J. W. Coombs.
W. Lillie

Inventor:
Bernard McCollum

UNITED STATES PATENT OFFICE.

BERNARD McCOLLUM, OF NEW YORK, N. Y.

IMPROVEMENT IN WINDOW-SHUTTERS.

Specification forming part of Letters Patent No. 59,430, dated November 6, 1866; antedated October 27, 1866.

*To all whom it may concern:*

Be it known that I, BERNARD MCCOLLUM, of the city, county, and State of New York, have invented certain new and useful Improvements in Window-Shutters; and I do hereby declare that the following is a full, clear, and exact description of the same, reference being had to the accompanying drawings, making a part of this specification, in which—

Figure 1:
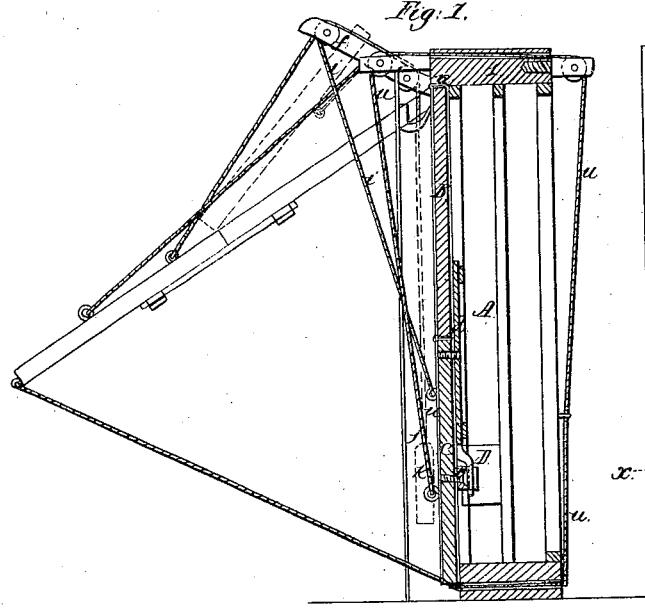
Figure 3:
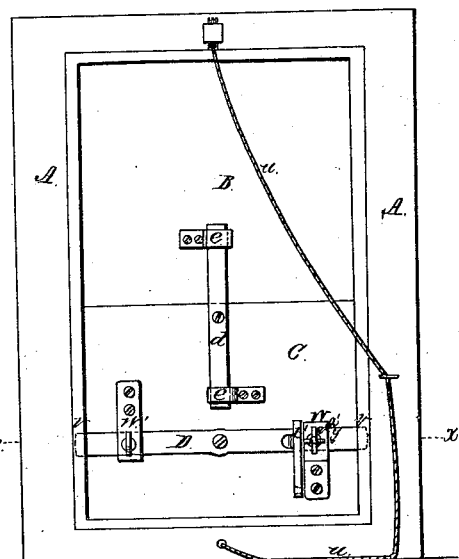
Figure 2:
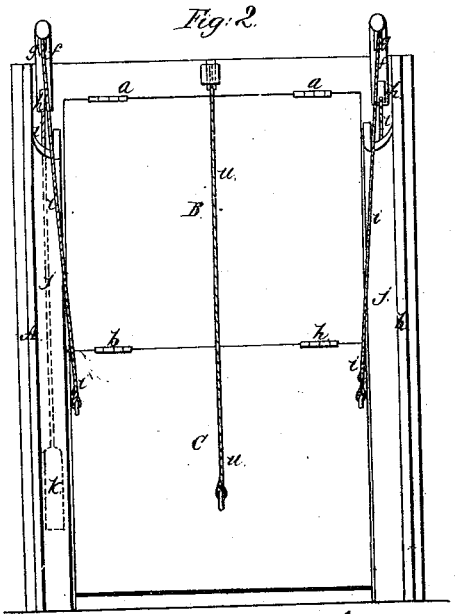
Figure 4:
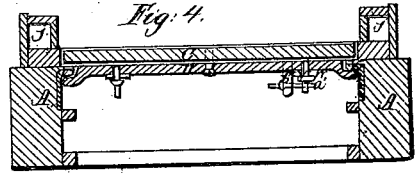

Figure 1 is a central vertical transverse section. Fig. 2 is a front elevation. Fig. 3 is a rear elevation. Fig. 4 is a horizontal transverse section taken in the line $x$ $x$ of Fig. 3.

Similar letters of reference indicate corresponding parts in all the figures.

This invention consists in certain novel arrangements of parts whereby the shutter may, when desired, be used either wholly or partially as an awning over the window to which it is applied, and whereby it may be very conveniently operated in closing or opening, and be held in proper position when opened, and, furthermore, by which it is very securely fastened in place when closed.

To enable others to understand the construction and operation of my invention, I will proceed to describe it with reference to the drawings.

A is the frame of the window, to which the shutter B C is applied, the shutter being hinged horizontally to the top of the window-frame, as shown at $a$. The shutter is divided transversely into two parts, B and C, which are hinged together by hinges $b$, so that the lower part, C, may be turned up against the outer surface of the upper part, B, when desired. Pivoted upon the rearmost side of the lower part, C, near the upper edge thereof, is a bar, $d$, the ends of which fit into cleats or straps $e$ $e$, secured one upon the rearmost side of each part, B C, in such manner that when the said bar $d$ is vertical the two parts B and C of the shutter will be rigidly held in line with each other, as shown in Figs. 1 and 2, while by turning the said bar down in a horizontal position the lower part, C, is left free to turn on the hinges $b$, as just mentioned. Projecting outward from the top of the window-frame A are two arms or brackets, $f$. In the outer end of each bracket is a small pulley, $g$, and at the rearmost end thereof is another pulley, $h$. A cord, $i$, extends upward from each side of the shutter, over the pulleys $g$ and $h$, and thence downward into a vertical casing, $j$, and has a weight, $k$, (shown in dotted lines in Figs. 1 and 2,) which slides up and down in the said casing. These weights $k$ counterbalance the weight of the shutter when in an elevated position, as will be presently further explained. A short bracket, $l$, projects from the outer side of the top of the window-frame, and has in its outer end a pulley, $m$. A corresponding bracket, $n$, projects from the inner side of the frame, which is also provided with a pulley, $r$, and formed transversely in the bottom of the window-frame is a hole, $s$. A cord, $u$, extends upward from the outer side of the lower part, C, of the shutter, passes over the pulleys $m$ and $r$, and thence downward and through the hole $m$, and has its end fastened to the inner side of the part C, at the lower edge thereof. This cord is used to operate the shutter, to open or close the same.

The shutter is fastened in a closed position, when desired, by means of a locking-bar, D, which is situated on the rearmost side of the part C thereof, and is pivoted at its center, near the lower edge of the said part C. When this bar D is in a horizontal position, as represented in the drawings, its ends project behind vertical slats or cleats $v$, secured upon the sides of the window-frame, and thus prevent the shutter from being swung outward. $w$ and $w'$ are two vertical cleats or straps, so shaped and secured to the inner side of the part C of the shutter as to strengthen the bar D when in a transverse or horizontal position, as just set forth, against any force applied to pull the shutter outward, and at the same time allow the said bar to be turned upon its pivot, so as to bring its ends clear of the slats or cleats $v$ when it is desired to open the shutter.

$a'$ is a broad-headed screw which passes through the cleat $w$, and through the end of the bar D into the shutter. The head of this screw $a'$ has a transverse hole formed in it, and pivoted at one side of the cleat is a short bar, $b'$, which has a transverse hole formed in its upper end. A pin or bolt, $d'$, is passed through this hole and through the hole in the head of the screw $a'$, and prevents the said screw from being pulled out, and consequently retains the locking-bar D in place to fasten the shutter in a closed position. A padlock may be employed in place of the pin $d'$, if desired.

When it is desired to open the shutter, the pin $d'$ and screw $a'$ are taken out, and the bar D is turned upon its pivot until its ends are brought clear of the slats or cleats $v$. That part of the cord $u$ which is situated upon the inner side of the window-frame A is then pulled downward, which turns the shutter upon its hinges $a$ and brings it into the position shown in red lines in Fig. 1, and thus opens the window. In this position the shutter forms an awning over the window, and is retained in place by the weights $k$ upon the ends of the cords $i$.

When it is desired to diminish the size of such awning the bar $d$ is turned in a horizontal position, which allows the part C of the shutter to turn or fold up against or upon the outer side of the part B, as shown by dotted red lines in Fig. 1.

What I claim as new, and desire to secure by Letters Patent, is—

1. The shutter hinged horizontally to the upper side of the window-frame and divided transversely into two parts, B C, hinged together and arranged, with reference to the window-frame A, substantially as herein set forth.

2. The cord $u$, weighted cords $i$, and brackets $f$, arranged in relation with each other and with a horizontally-hinged and transversely-divided shutter, and with the window-frame A, substantially as herein set forth, for the purpose specified.

3. The pivoted cross-bar D, cleat $w$, pivoted bar $b'$, screw $a'$, and pin or padlock $d'$, in combination with each other and with the horizontally-hinged and transversely-divided shutter, and with the window-frame A, substantially as herein set forth, for the purpose specified.

BERNARD McCOLLUM.

Witnesses:
J. W. COOMBS,
A. LE CLERC.